(12) United States Patent
Soltis et al.

(10) Patent No.: US 6,360,709 B1
(45) Date of Patent: Mar. 26, 2002

(54) PISTON TOP GEOMETRY FOR OPTIMIZED COMBUSTION

(75) Inventors: Dennis A Soltis, Lake Orion; Kenneth P DeGroot, Macomb Township; Joseph Jenkins, Detroit; Philip S Keller, Royal Oak; Bruce H Teague, Grosse Pointe Park; Jeffrey W Anderson, Rochester Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/472,378

(22) Filed: Dec. 23, 1999

(51) Int. Cl.[7] .................................................. F02B 23/00
(52) U.S. Cl. .................................................... 123/193.6
(58) Field of Search ............................. 123/193.6, 661, 123/667

(56) References Cited

U.S. PATENT DOCUMENTS

| | | | |
|---|---|---|---|
| 4,300,499 A | * | 11/1981 | Nakanishi et al. ........... 123/661 |
| 5,305,720 A | * | 4/1994 | Ando et al. ............... 123/193.6 |
| 5,309,879 A | * | 5/1994 | Regueiro ................. 123/193.6 |
| 5,363,820 A | * | 11/1994 | Neitz .......................... 123/667 |
| 5,738,057 A | | 4/1998 | Vallejos |
| 6,019,079 A | * | 2/2000 | Sakurahara et al. ..... 123/193.6 |

* cited by examiner

Primary Examiner—Marguerite McMahon
(74) Attorney, Agent, or Firm—Kenneth H. Maclean

(57) ABSTRACT

A piston and cylinder assembly according to the invention includes a cylinder block having a cylinder defined by a cylinder bore wall, a cylinder head connected to the cylinder block, and a piston for reciprocating in the cylinder relative the cylinder head. A combustion chamber for an air/fuel mixture has a volume formed by the cylinder bore wall, cylinder head, and the piston, and is divided into an intake side and an exhaust side by a longitudinal center axis of the piston. A spark plug is mounted in the cylinder head and extends into the combustion chamber to ignite the air/fuel mixture therein. A crown of the piston has a raised peak offset from the longitudinal center axis for providing a homogeneous air/fuel mixture in the combustion chamber near the spark plug.

24 Claims, 9 Drawing Sheets

(4 of 9 Drawing Sheet(s) Filed in Color)

PISTON TOP GEOMETRY FOR OPTIMIZED COMBUSTION

BACKGROUND OF THE INVENTION

1. Field of the Invention

The present invention relates generally to a piston design, and more particularly, to a piston having a sloped crown.

2. Description of Related Art

In a combustion engine, a combustion chamber is formed by a cylinder head, cylinder bore wall and piston crown. The piston crown, which is the surface of the piston exposed to an air/fuel mixture, may be flat, concave, convex, or shaped so as to promote turbulence or control combustion in the combustion chamber. Conventional piston crowns are shaped to achieve a desired compression ratio, as well as to accommodate the intake and exhaust valves located within the cylinder head. But, conventional pistons do not optimally distribute the air/fuel mixture in the combustion motion of the piston's compression stroke. As a result, the combustion charge is not homogeneous, and the charge in some regions of the combustion chamber has a greater volatility than other regions. Uneven, or unpredictable, combustion occurs, resulting in poor emissions, spark knock problems, idle instability, and exhaust gas recirculation intolerance.

SUMMARY OF THE INVENTION

The piston according to the invention more evenly distributes the air/fuel mixture in the combustion chamber and provides a more homogeneous air/fuel mixture near the spark plug, resulting in an improved combustion charge that reduces emissions, promotes idle stability, and improves exhaust gas recirculation tolerance. The piston generally includes a sloped crown supported by a cylindrical body. The sloped crown includes a pair of slopes converging toward a raised peak, which is disposed offset from a longitudinal center axis of the piston cylindrical body and toward an exhaust side of the combustion chamber. As the piston moves through the compression stroke, the sloped crown alters the combustion motion, or velocity and flow direction, of the air/fuel mixture. The resulting combustion motion is directed toward the exhaust side of the combustion chamber, thereby causing a less localized air/fuel ratio distribution and a more homogeneous air/fuel ratio near the spark plug.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The claim of this patent contains at least one drawing executed in color.

The present invention will become more fully understood from the detailed description and the accompanying drawings, wherein.

DETAILED DESCRIPTION OF THE PREFERRED EMBODIMENTS

Figure 1:
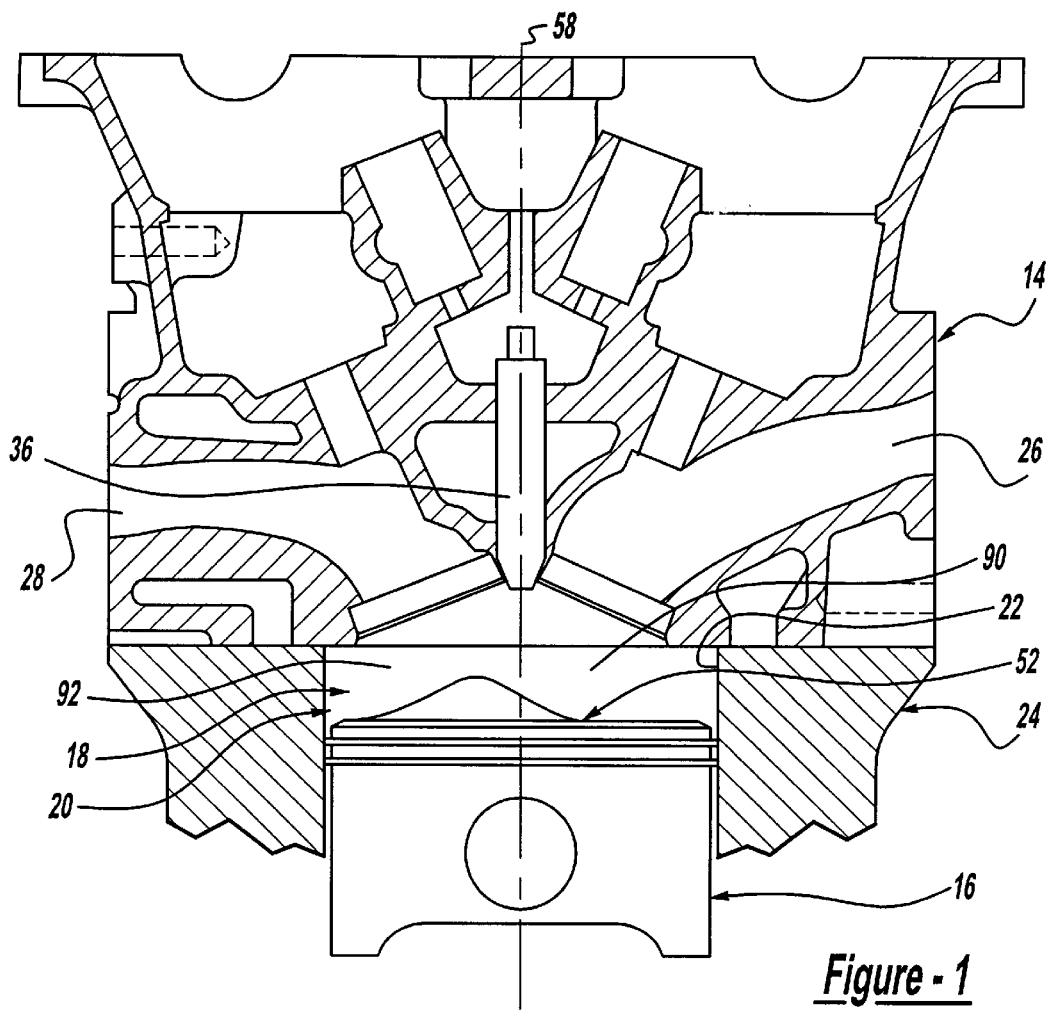
FIG. 1 is a partial sectional view showing the preferred embodiment of the present invention piston with a cylinder head.

FIG. 1 shows a cylinder head 14 disposed above a cylinder block 24 including a piston 16 in a cylinder 20 according to the invention. The cylinder 20 is defined by a circular cylinder bore wall 22 and includes a longitudinal central axis 58. The cylinder head 14, cylinder bore wall 22, and piston 16 define a combustion chamber 18, wherein a spark plug 36 ignites an air/fuel mixture therein. Specifically, the cylinder head 14 defines a top wall of combustion chamber 18, the cylinder bore wall 22 forms a side wall of combustion chamber 18, and a crown 52 of the piston 16 defines a bottom wall of the combustion chamber 18. The volume of the combustion chamber 18 varies with the position of the piston 16 in the cylinder 20. A pair of intake ports 26 and a pair of exhaust ports 28 extend through the cylinder head 14 to provide a fluid connection to the combustion chamber 18. As illustrated further by FIG. 4, the exhaust ports 28 are disposed on one side of the cylinder head 14, while the intake ports 26 are disposed on an opposite side. Correspondingly, the combustion chamber 18 has an intake side 90 and an exhaust side 92. The spark plug 36 is centrally mounted in the cylinder head 14 between the intake ports 26 and exhaust ports 28, and extends into the combustion chamber 18 to periodically ignite the combustion charge therein.

As is conventional, the piston 16 reciprocates within the cylinder 20 to define an induction stroke, a compression stroke and an expansion stroke. As the piston 16 moves toward the top of the cylinder 20 during the compression stroke, the air/fuel mixture is drawn into the combustion chamber 18, and a turbulent flow of the air/fuel mixture within the combustion chamber 18 results. The spark plug 36 is fired to ignite the air/fuel mixture prior to the piston 16 reaching the top of the cylinder block 24.

Figure 2A:
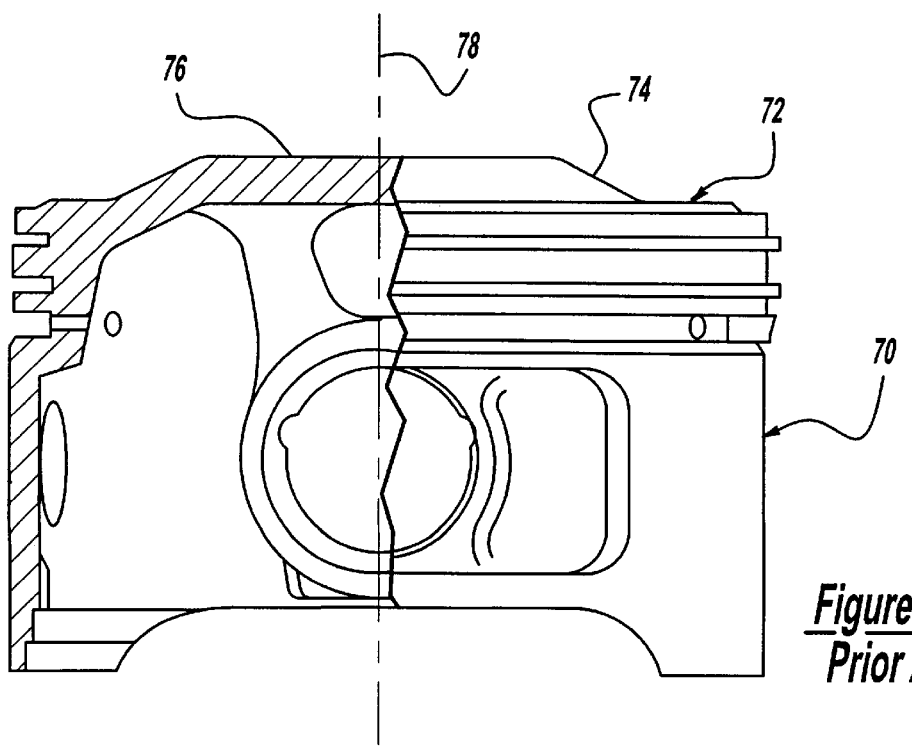
FIG. 2(a) is a partial sectional view of a conventional piston.

Referring to FIG. 2(a), a conventional piston 70 is shown in partial cross-section. The piston 70 includes a tapered crown 72 including a circumferential slope 74 to a centrally disposed raised portion 76. The shape of the crown 72 affects the flow of the air/fuel mixture in the combustion chamber during the compression stroke of the piston 70. The generally circular raised portion 76 is shaped symmetrically about a longitudinal center axis 78 of the piston 16.

Figure 2B:
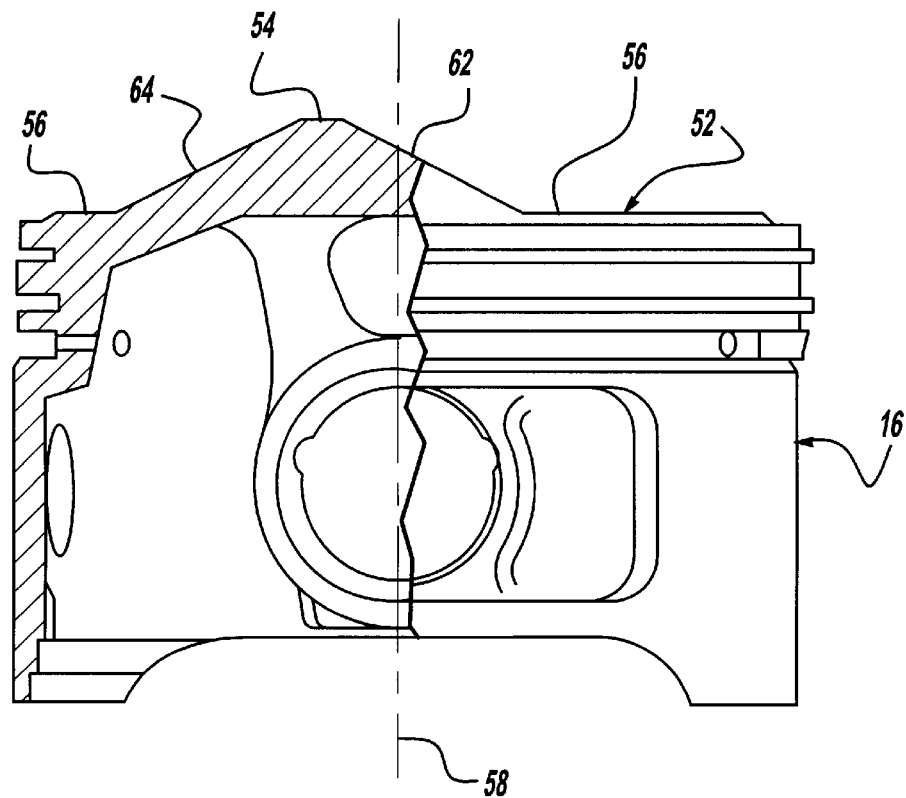
FIG. 2(b) is a partial sectional view of the piston of FIG. 1.
Figure 3:
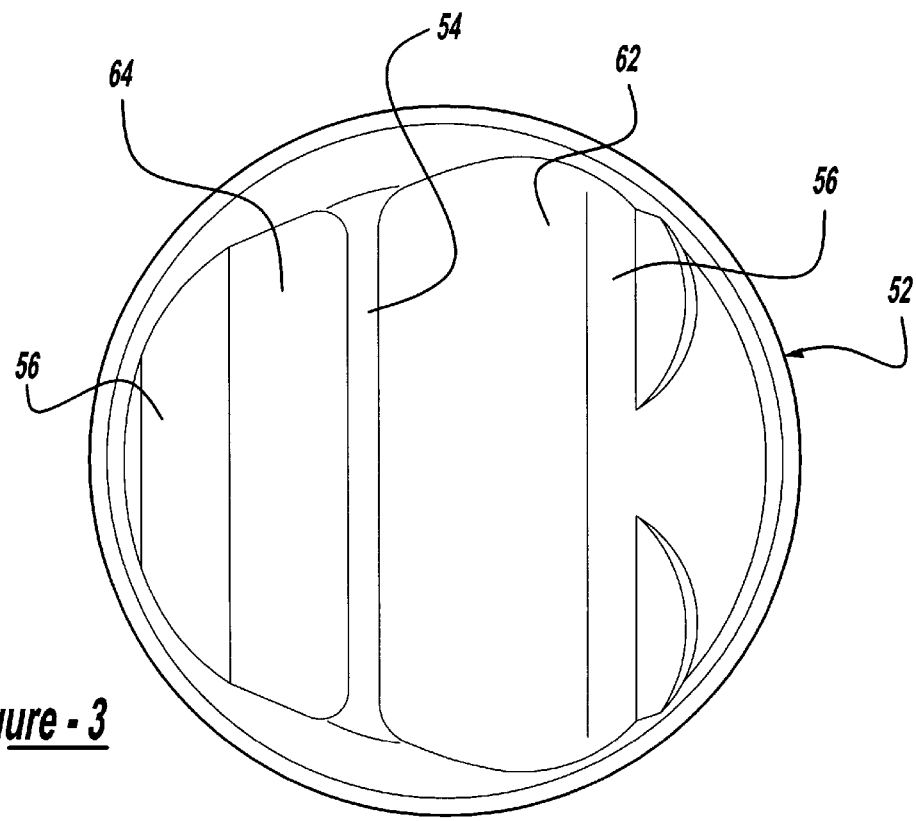
FIG. 3 is a plan view of the piston of FIG. 2(b)

With reference to FIGS. 2(b) and 3, the piston 16 of the present invention includes a sloped crown 52 having a pair of slopes 62, 64 converging from a surface 56 toward a generally rectangular peak 54 offset from the longitudinal center axis 58. More specifically, the piston crown 52 extends upwardly from the body of the piston 16 such that the peak 54 is disposed between the longitudinal center axis 58 and the exhaust ports 28. In the preferred embodiment, the peak 54 is a plane disposed generally perpendicular to the longitudinal central axis 58, and extends about 2 to 10 millimeters between the flanking slopes 62, 64 for the piston 16 in an approximately 87.5 millimeter diameter cylinder 20. Most preferably, the peak 54 extends about 4 millimeters between the slopes 62, 64. Thus, the peak 54 preferably extends approximately 2 to 10 percent of the diameter of the cylinder 20. The height of the peak 54 relative the surface 56 of the crown 52 is preferably 8 to 12 millimeters, and most preferably 9.2 millimeters to 10.45 millimeters. Thus, peak 54 of piston 16 is preferably raised 9 to 14 percent of the diameter of the cylinder 20. The angle of each slope 62, 64 relative the surface 56 of the crown 52 is preferably 15° to 35°, and most preferably 23.3° to 28°. Further, the center of the peak 54 is preferably offset from the longitudinal central axis 58 of the piston approximately 6 to 15 millimeters, and most preferably about 10.27 millimeters, toward the exhaust side of the combustion chamber 18 for the piston 16 in an approximately 87.5 millimeter diameter cylinder 20. Thus, the peak 54 is offset relative the longitudinal central axis 58 approximately 6 to 18 percent of the diameter of the cylinder 20.

In the preferred embodiment, the peak 54 of the crown 52 decreases the volume of the combustion chamber 18 adjacent the exhaust port 28. As the piston 16 approaches top dead center of the compression stroke, the crown 52 alters the combustion motion, or velocity and flow direction, of the air/fuel mixture, resulting in improved combustion. The resulting combustion motion is directed toward the exhaust side 92 of the combustion chamber 18, thereby causing a less localized air/fuel ratio distribution and a more homogeneous air/fuel mixture near the spark plug 36.

Figure 4:
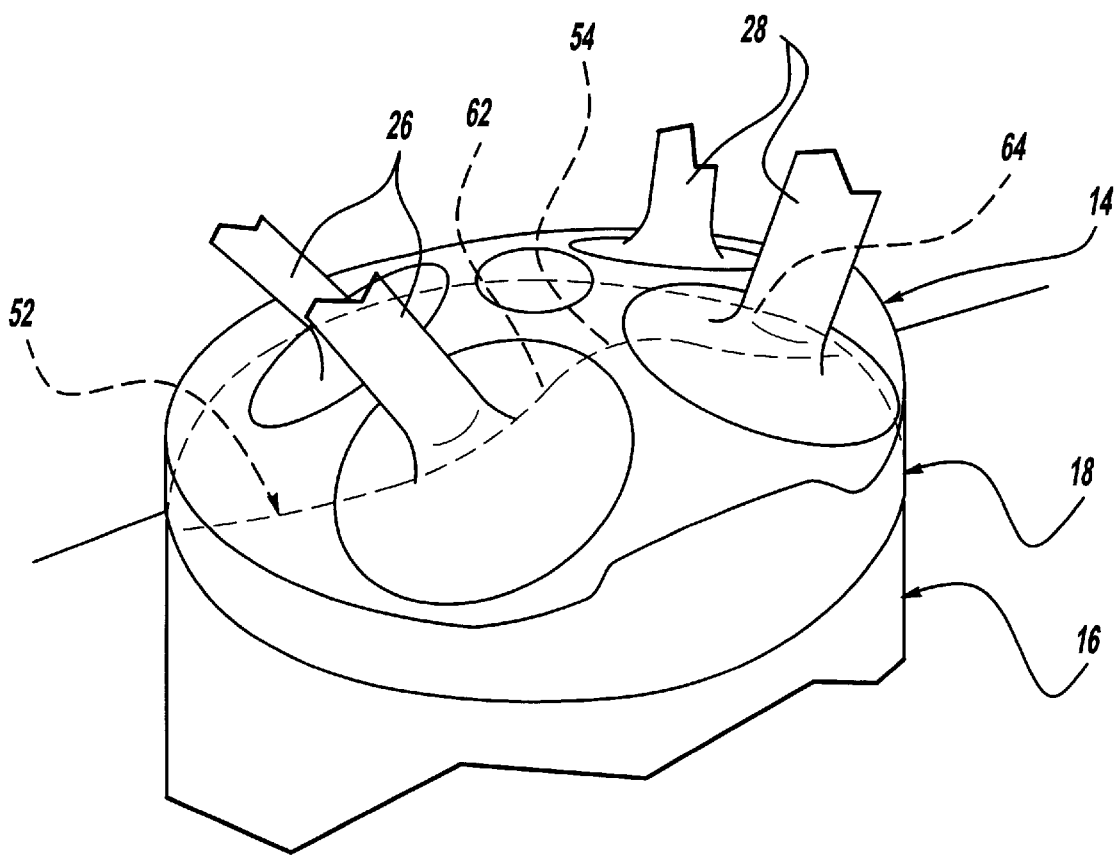
FIG. 4 is a perspective view illustrating the combustion chamber of FIG. 1.

FIG. 4 illustrates the volume of the combustion chamber 18, which is generally defined by the cylinder bore wall 22, the cylinder head 14, and the crown 52 of the piston 16. Thus, FIG. 4 illustrates the volume of the combustion chamber 18 as defined by the piston 16 of the present invention. For illustrative purposes, the exhaust ports 28 and the intake ports 26, as well as the slopes 62, 64 converging toward the peak 54 of the sloped piston crown 52, are shown. The air/fuel mixture injected into the combustion chamber 18 flows in a combustion motion as the piston 16 moves toward the cylinder head 14 during the compression stroke.

Figure 5:
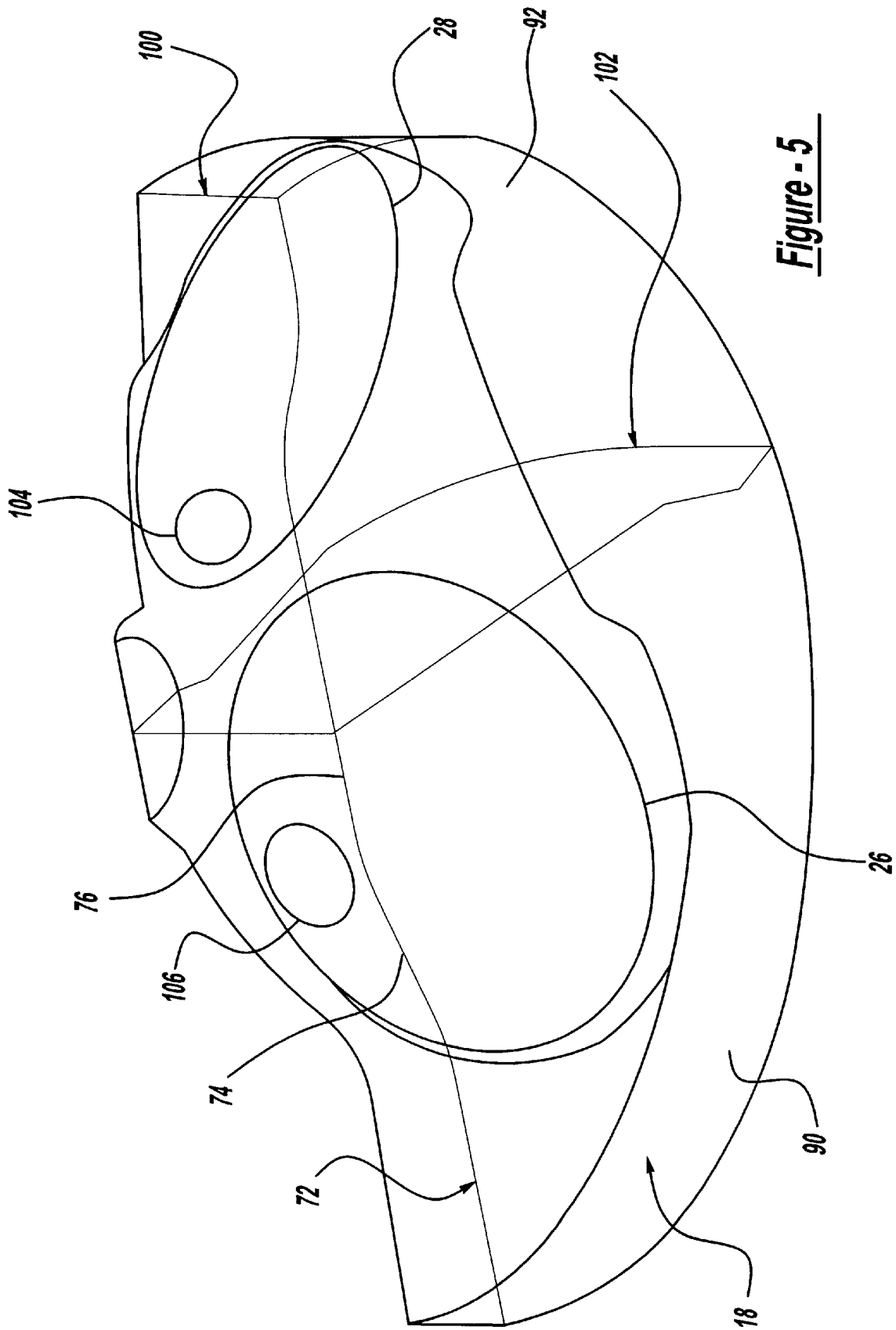
FIG. 5 is a partial perspective view of the combustion chamber of a conventional piston.
Figure 6:
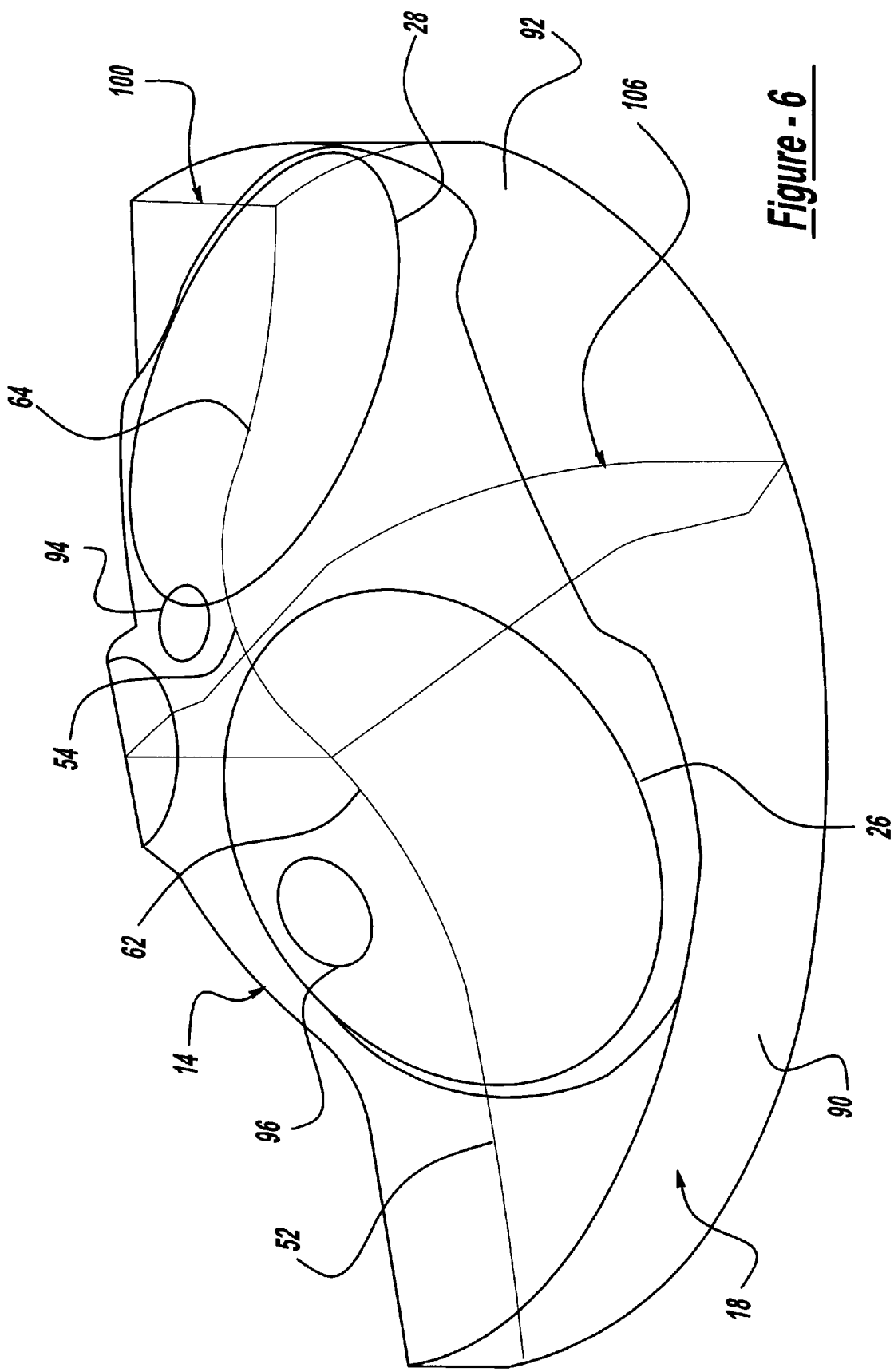
FIG. 6 is a partial perspective view of the combustion chamber of FIG. 1.

FIGS. 5 and 6 illustrate the combustion motion in the combustion chamber 18 for a conventional piston 70 and the piston 16 of the present invention, respectively. For illustrative purposes, the combustion chamber 18 of each FIG. 5 and 6 has been modified to include plane 100 and plane 102, disposed perpendicularly to one another to illustrate the air/fuel mixture flow and distribution, which will be explained in reference to FIGS. 7–10. For both pistons 16, 70, the direction of the velocity vectors of the air/fuel mixture and the distribution of the air/fuel mixture varies through the combustion chamber 18 cross-section from the intake side 90 to the exhaust side 92. In FIG. 5, the conventional piston 70 includes an intake-side zone 106 on the intake side 90 of the combustion chamber 18. Further, the exhaust side 92 of the combustion chamber 18 has an exhaust-side zone 104. Similarly, in FIG. 6, the piston 16 of the present invention includes an intake-side zone 96 on the intake-side 90 of the combustion chamber. Further, the exhaust-side 92 of the combustion chamber has an exhaust-side zone 94 for the piston 16. These illustrative drawings, and particularly the intake-side zones 106, 96 and exhaust-side zones 104, 94 of the pistons 70, 16, respectively, will be used to explain the combustion motion improvements illustrated by FIGS. 7–10.

Figure 7:
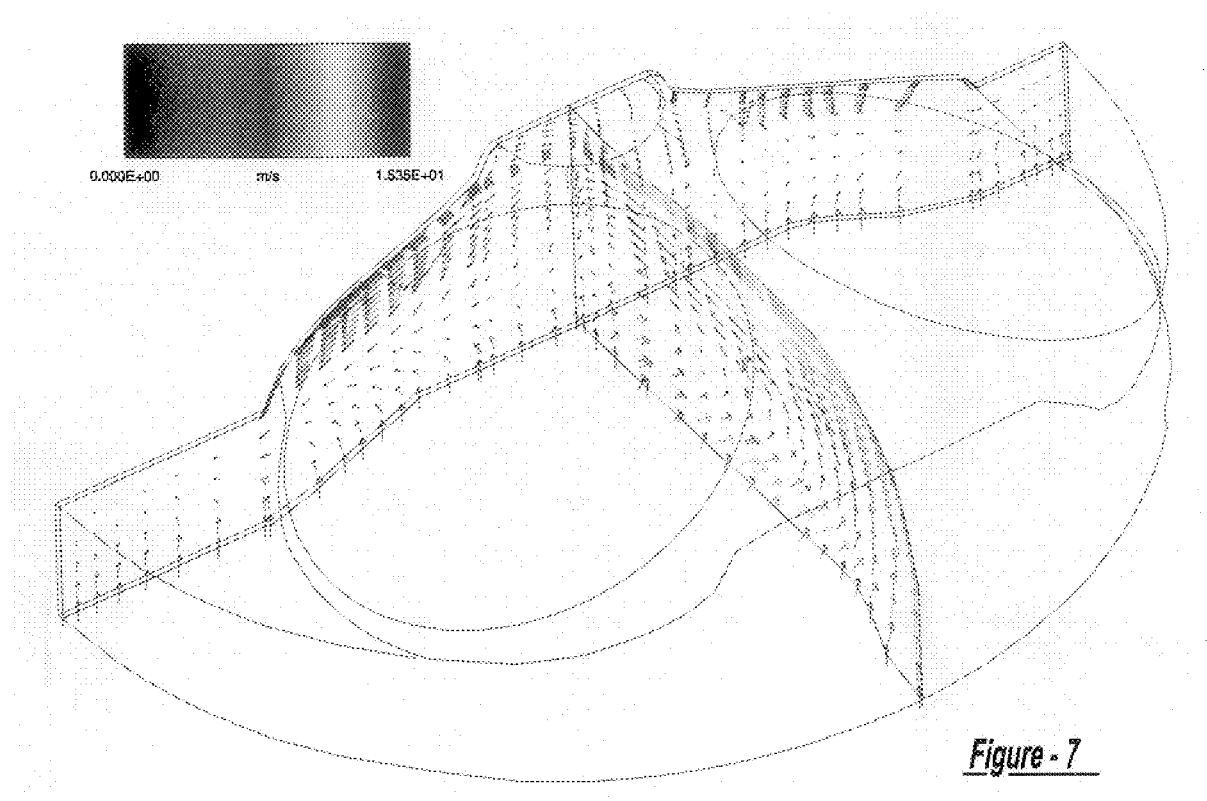
FIG. 7 is a partial perspective view illustrating the combustion motion of an air/fuel mixture in the combustion chamber of FIG. 5.
Figure 8:
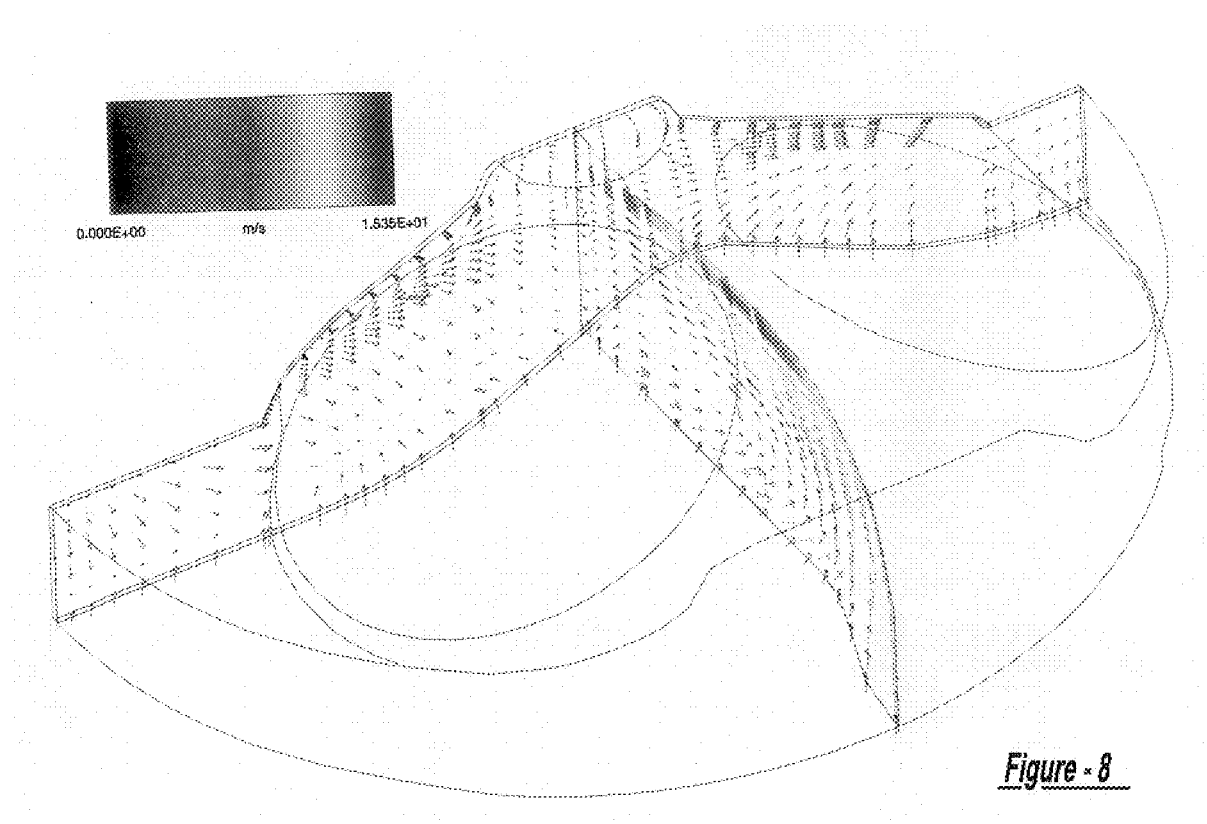
FIG. 8 is a partial perspective view illustrating the combustion motion of an air/fuel mixture in the combustion chamber of FIG. 6.

FIGS. 7 and 8 illustrate the combustion motion through velocity vectors colored according to a scale ranging from 0.0 meters per second to 1.535 meters per second. For FIG. 7, the intake-side zone 106, as referenced in FIG. 5, shows that the combustion motion forces the air/fuel mixture away from the exhaust side 92. Further, the exhaust-side zone 104 illustrates combustion motion directed away from the spark plug 36 and toward the exhaust side 92.

Figure 9:
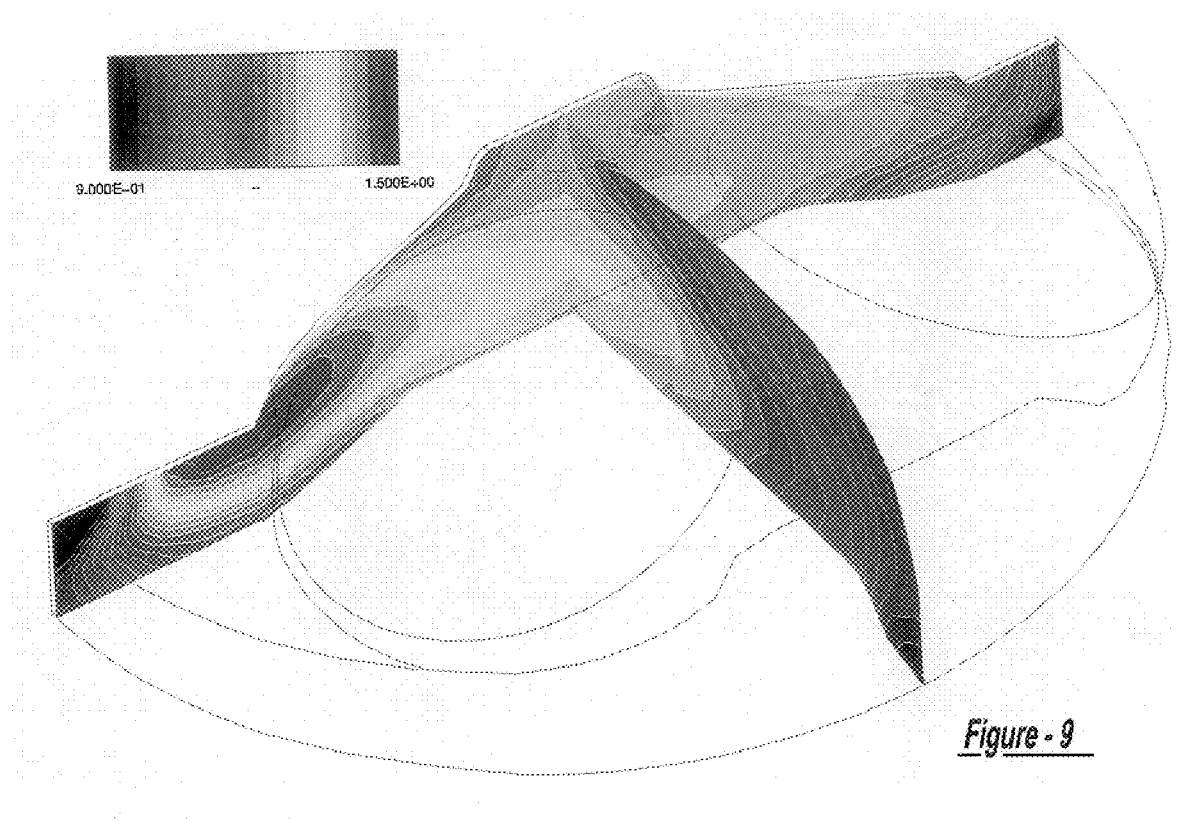
FIG. 9 is a partial perspective view illustrating the distribution of the air/fuel mixture in the combustion chamber of FIG. 5.
Figure 10:
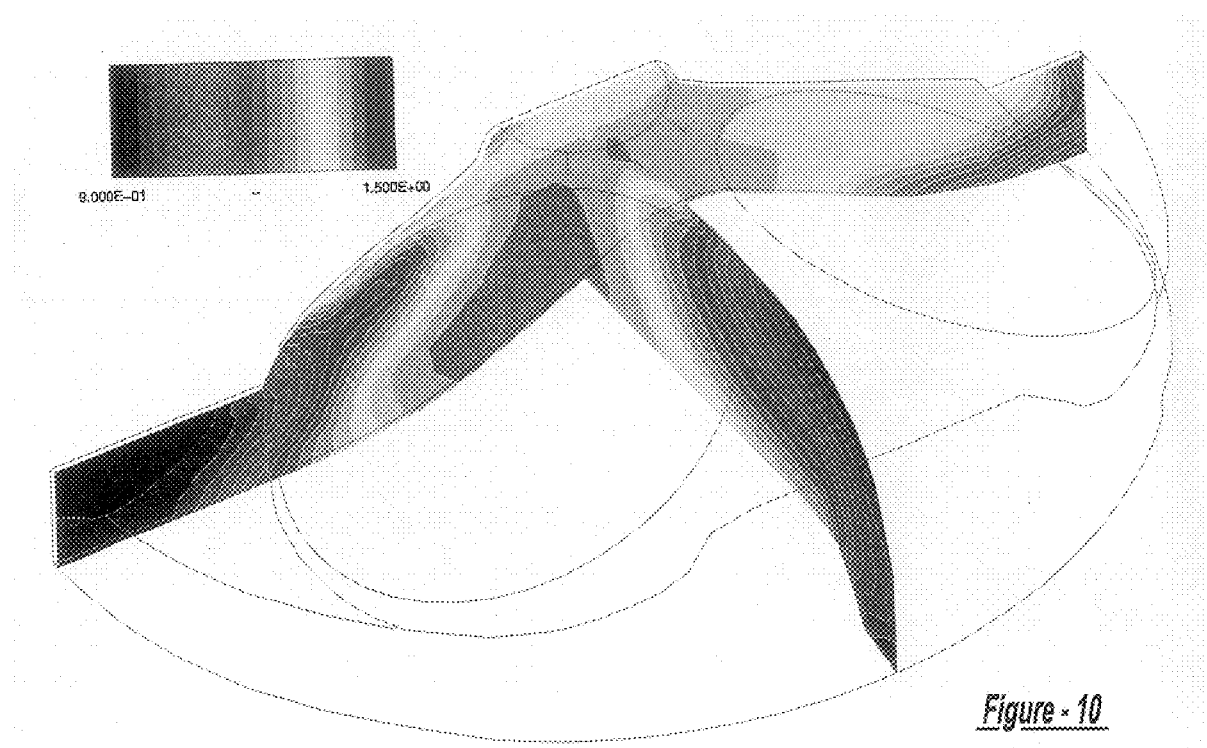
FIG. 10 is a partial perspective view illustrating the distribution of the air/fuel mixture in the combustion chamber of FIG. 6.

Altering combustion motion affects the air/fuel ratio distribution throughout the combustion chamber 18. FIGS. 9 and 10 illustrate the air/fuel distribution in the combustion chamber 18 resulting from the conventional piston 70 and the piston 16 of the present invention, respectively, with a scale ranging from 0.9 to 1.5 of the equivalence ratio, where 1.0 equivalence ratio is stoichiometric. In FIG. 9, with reference to FIG. 5, for the conventional piston 70, the intake side 90 of the combustion chamber 18 has an excessively localized air/fuel mixture, while the volume surrounding the spark plug 36 has a non-homogeneous air/fuel mixture. In FIG. 10, with reference to FIG. 6, for the piston 16 of the present invention, the localized air/fuel mixture at the intake side 78 of the combustion chamber 18 is not as concentrated as the excessively localized air/fuel mixture that results from use of the conventional piston 70, and the volume surrounding the spark plug 36 is a near homogeneous air/fuel mixture. This results in improved combustion.

The air/fuel ratio surrounding the spark plug 36 is homogeneous in the combustion chamber 18 when combustion motion is effected by the piston 16 of the present invention as compared to the combustion motion effected by a traditional piston 70. The conventional piston 70 causes a relatively non-homogeneous and lean air/fuel ratio in the volume surrounding the spark plug 36. The non-homogeneous and lean concentration causes a reduction in the engine's tolerance of exhaust gas recirculation, a deterioration of idle stability, the occurrence of engine knock issues, and an increase in emissions. The piston 16 of the present invention provides a more homogeneous air/fuel mixture near the spark plug 36 and an improved air/fuel ratio in the compression chamber 18. This more homogeneous air/fuel mixture and improved air/fuel ratio distribution results in reduced emissions, increased idle stability, higher engine torque, lower fuel consumption, and better exhaust gas recirculation tolerance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A piston and cylinder assembly for modifying the air/fuel mixture near a spark plug in an internal combustion engine, comprising:

a cylinder block having a cylinder with a diameter defined by a cylinder bore wall;

a cylinder head enclosing one end of the cylinder and mounting the spark plug;

a piston disposed within the cylinder for reciprocation relative the cylinder head;

a combustion chamber formed of the volume between the cylinder bore wall, the piston, and the cylinder head, the combustion chamber being divided into an intake side and an exhaust side by a longitudinal center axis through the piston and cylinder assembly; and a crown of the piston including a pair of slopes converging toward a generally rectanguler raised peak for creating a combustion motion, the raised peak disposed offset from the longitudinal center axis on the exhaust side of the piston, the combustion motion being directed toward the exhaust side of the combustion chamber.

2. The piston and cylinder assembly of claim 1 wherein the raised peak is disposed in the exhaust side of the combustion chamber.

3. The piston and cylinder assembly of claim 1 wherein the raised peak is raised between 9 and 14 percent of the diameter of the cylinder.

4. The piston and cylinder assembly of claim 3 wherein the raised peak is raised between 10.5 and 12.0 percent of the diameter of the cylinder.

5. The piston and cylinder assembly of claim 1 wherein the offset is 6 to 18 percent of the diameter of the cylinder.

6. The piston and cylinder assembly of claim 1 wherein the slopes converge toward the raised peak, each slope having an angle relative to the surface of the piston crown of between 15 and 35 degrees.

7. A piston and cylinder assembly of claim 6 wherein the slopes converge toward the raised peak, each slope having an angle relative to the surface of the piston crown of between 23.3 and 28 degrees.

8. The assembly of claim 1 wherein the volume of the air/fuel mixture surrounding the spark plug is substantially homogeneous such that improved combustion results.

9. The assembly of claim 1 wherein the combustion motion is directed toward the exhaust side of the combustion chamber, whereby a less concentrated air-fuel mixture results near the intake side of the combustion chamber.

10. A piston for a piston and cylinder assembly including a combustion chamber comprising a volume for an air/fuel mixture, the volume defined by a piston, a cylinder wall, and a cylinder head, the combustion chamber having an intake side and an exhaust side, the piston comprising:

a sloped crown supported by a cylindrical body, the cylindrical body of the piston having a longitudinal center axis, the sloped crown including a pair of slopes converging toward a generally rectanguler raised peak for creating a combustion motion, the raised peak disposed offset from the longitudinal center axis of the cylindrical body of the piston toward the exhaust side of the combustion chamber, the combustion motion being directed toward the exhaust side of the combustion chamber.

11. The piston and cylinder assembly of claim 10 wherein the raised peak is disposed in the exhaust side of the combustion chamber.

12. The piston and cylinder assembly of claim 10 wherein the raised peak is raised between 9 and 14 percent of the diameter of the cylinder.

13. The piston and cylinder assembly of claim 10 wherein the raised peak is raised between 10.5 and 12.0 percent of the diameter of the cylinder.

14. The piston and cylinder assembly of claim 10 wherein the offset is 6 to 18 percent of the diameter of the cylinder.

15. The piston and cylinder assembly of claim 10 wherein the slopes converge toward the raised peak, each slope having an angle relative to the surface of the piston crown of between 15 and 35 degrees.

16. A piston and cylinder assembly of claim 15 wherein the slopes converge toward the raised peak, each slope having an angle relative to the surface of the piston crown of between 23.3 and 28 degrees.

17. A piston and cylinder assembly comprising:

a cylinder block having a cylinder with a diameter defined by a cylinder bore wall;

a cylinder head connected to the cylinder block;

a piston for reciprocating in the cylinder relative the cylinder head;

a combustion chamber for an air/fuel mixture having a volume formed by the cylinder bore wall, cylinder head, and the piston, the combustion chamber being divided into an intake side and an exhaust side by a longitudinal center axis of the piston, a spark plug mounted in the cylinder head and extending into the combustion chamber to ignite the air/fuel mixture in the combustion chamber; and a crown of the piston having a generally rectanguler raised peak offset from the longitudinal center axis for providing a homogeneous air/fuel mixture in the combustion chamber near the spark plug.

18. The piston and cylinder assembly of claim 17 wherein the raised peak is disposed in the exhaust side of the combustion chamber.

19. The piston and cylinder assembly of claim 17 wherein the raised peak is raised between 9 and 14 percent of the diameter of the cylinder.

20. The piston and cylinder assembly of claim 18 wherein the raised peak is raised between 10.5 and 12.0 percent of the diameter of the cylinder.

21. The piston and cylinder assembly of claim 17 wherein the offset is 6 to 18 percent of the diameter of the cylinder.

22. The piston and cylinder assembly of claim 17 wherein the slopes converge toward the raised peak, each slope having an angle relative to the surface of the piston crown of between 15 and 35 degrees.

23. A piston and cylinder assembly of claim 22 wherein the slopes converge toward the raised peak, each slope having an angle relative to the surface of the piston crown of between 23.3 and 28 degrees.

24. The assembly of claim 17 wherein the piston causes a combustion motion of the air/fuel mixture directed toward the exhaust side of the combustion chamber.

* * * * *